United States Patent [19]

Steever et al.

[11] 3,863,577

[45] Feb. 4, 1975

[54] FLUIDIZED BED REACTOR

[75] Inventors: Andrew B. Steever, Old Greenwich, Conn.; David Kelleher, Yonkers, N.Y.

[73] Assignee: Dorr-Oliver Incorporated, Stamford, Conn.

[22] Filed: Nov. 22, 1971

[21] Appl. No.: 200,994

[52] U.S. Cl. ............... 110/8 R, 110/28 B, 432/58, 432/15
[51] Int. Cl. ............................................ F23g 3/00
[58] Field of Search ......... 263/21 A; 34/57 A, 57 E, 34/57 R; 110/28 B, 8 R; 432/58, 16, 15

[56] References Cited
UNITED STATES PATENTS

| | | | |
|---|---|---|---|
| 2,184,300 | 12/1939 | Hodson et al. | 263/21 A |
| 2,329,468 | 9/1943 | Hardgrove | 110/104 B |
| 2,535,730 | 10/1950 | Gadret | 110/28 B |
| 3,319,587 | 5/1967 | Albertson et al. | 110/8 R |
| 3,366,080 | 1/1968 | Albertson | 110/8 R |
| 3,411,465 | 11/1968 | Shivai | 110/8 R |
| 3,515,381 | 6/1970 | Foch | 110/8 R |
| 3,552,033 | 1/1971 | Steever et al. | 34/57 R |
| 3,578,798 | 5/1971 | Lapple | 263/21 A |

FOREIGN PATENTS OR APPLICATIONS

| | | | |
|---|---|---|---|
| 858,813 | 6/1958 | Great Britain | 110/28 J |
| 1,378,442 | 5/1964 | France | 110/8 |

Primary Examiner—Kenneth W. Sprague
Assistant Examiner—Henry C. Yuen
Attorney, Agent, or Firm—Burtsell J. Kearns; Theodore M. Jablon

[57] ABSTRACT

Combustion of waste materials in a fluidized bed reactor containing a bed of fluidized sand featuring the provision of auxiliary air injecting means or air jet devices mounted in the reactor wall in such a manner as to establish close to the bed a zone of intense turbulence, effecting simultaneous horizontal dispersion and combustion of said material in said zone substantially without after-burning.

15 Claims, 16 Drawing Figures

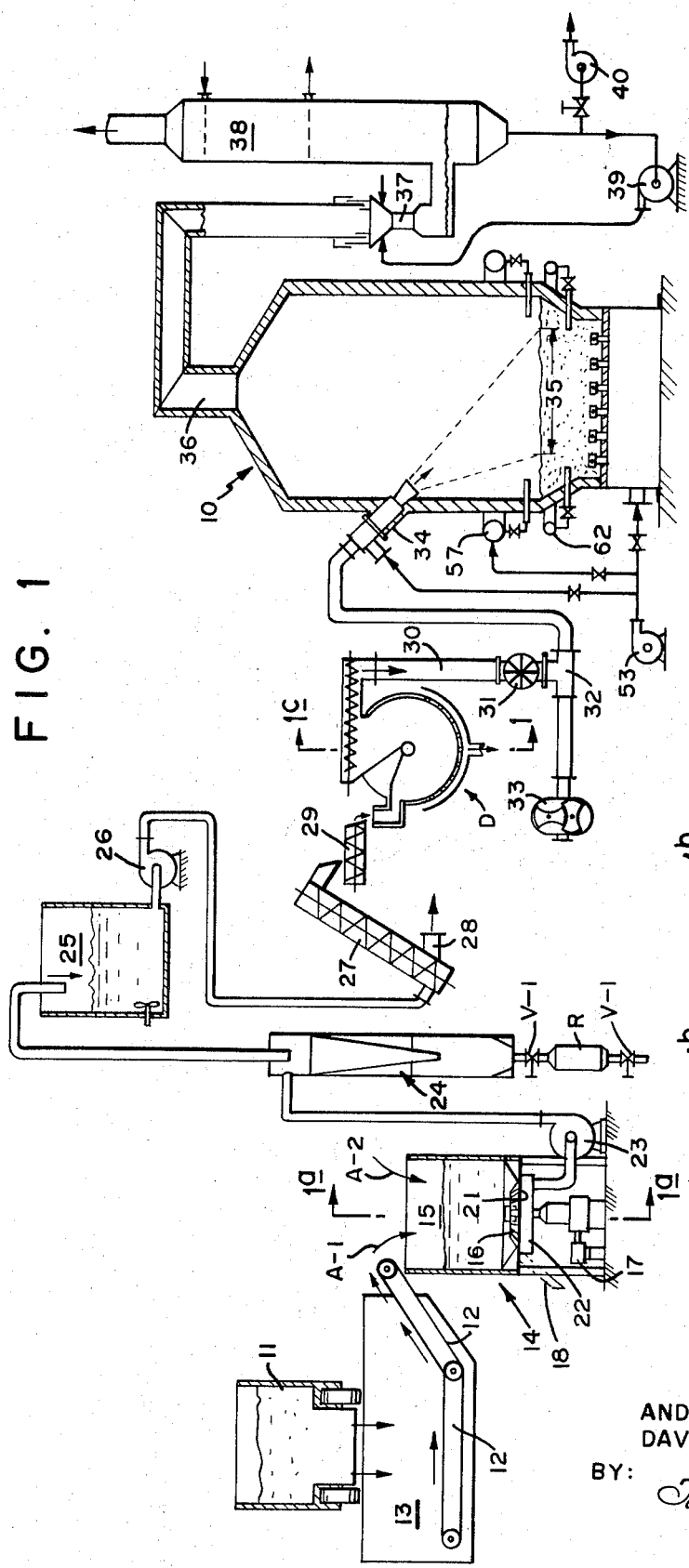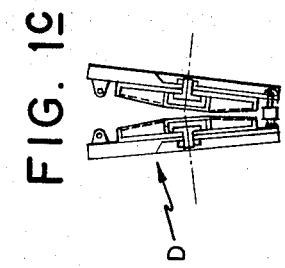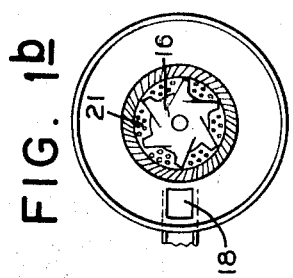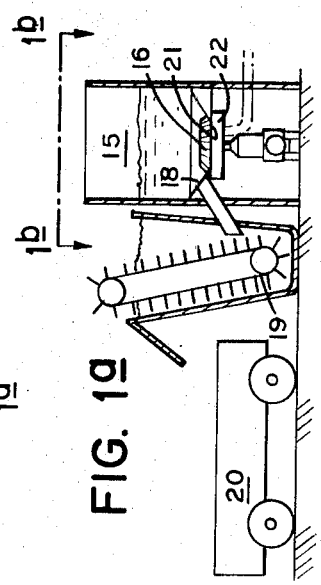

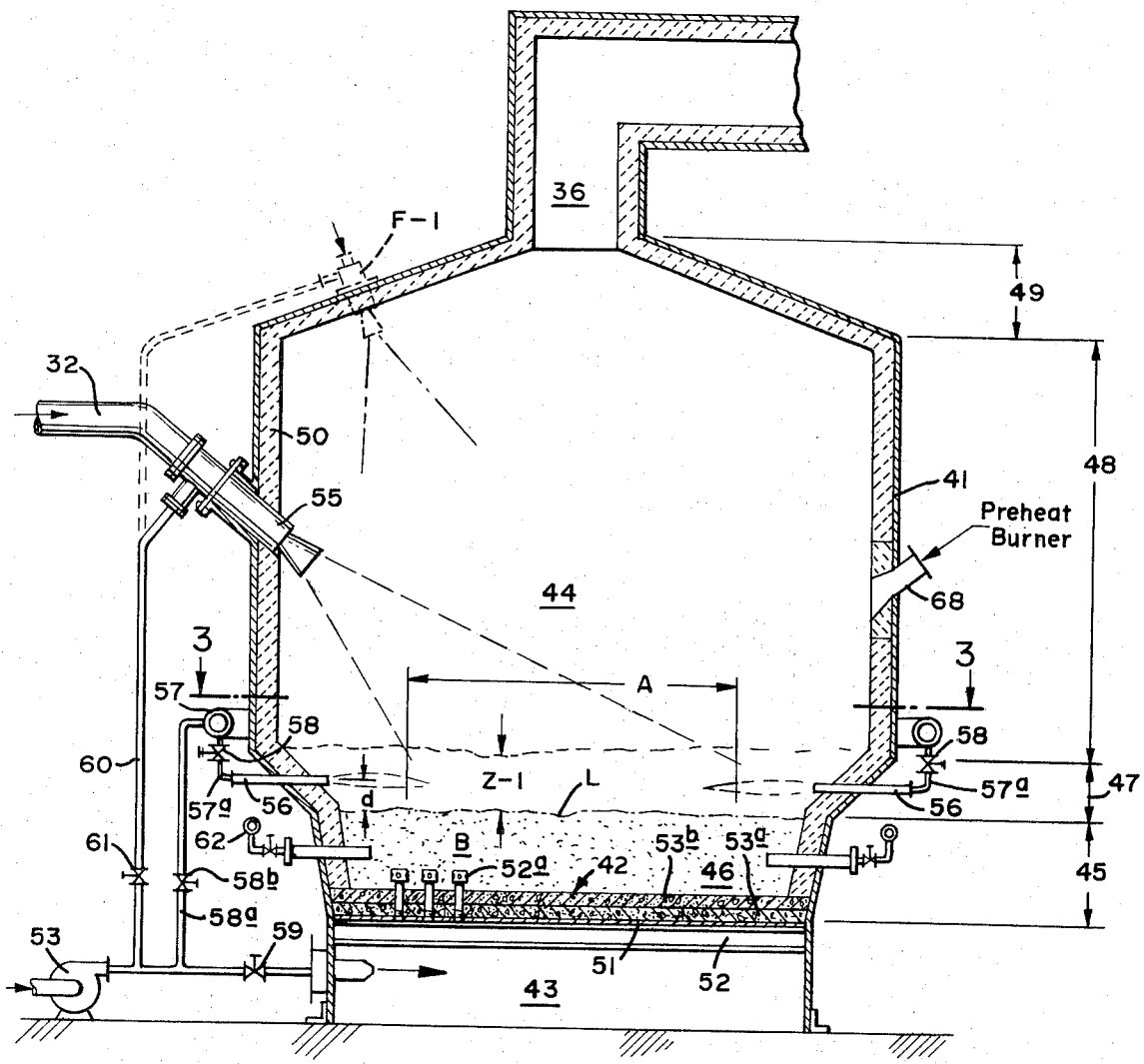
FIG. 2
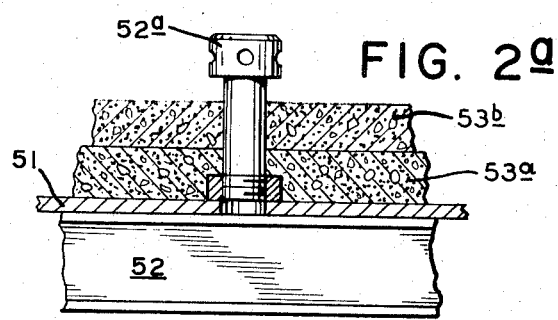
FIG. 2ª

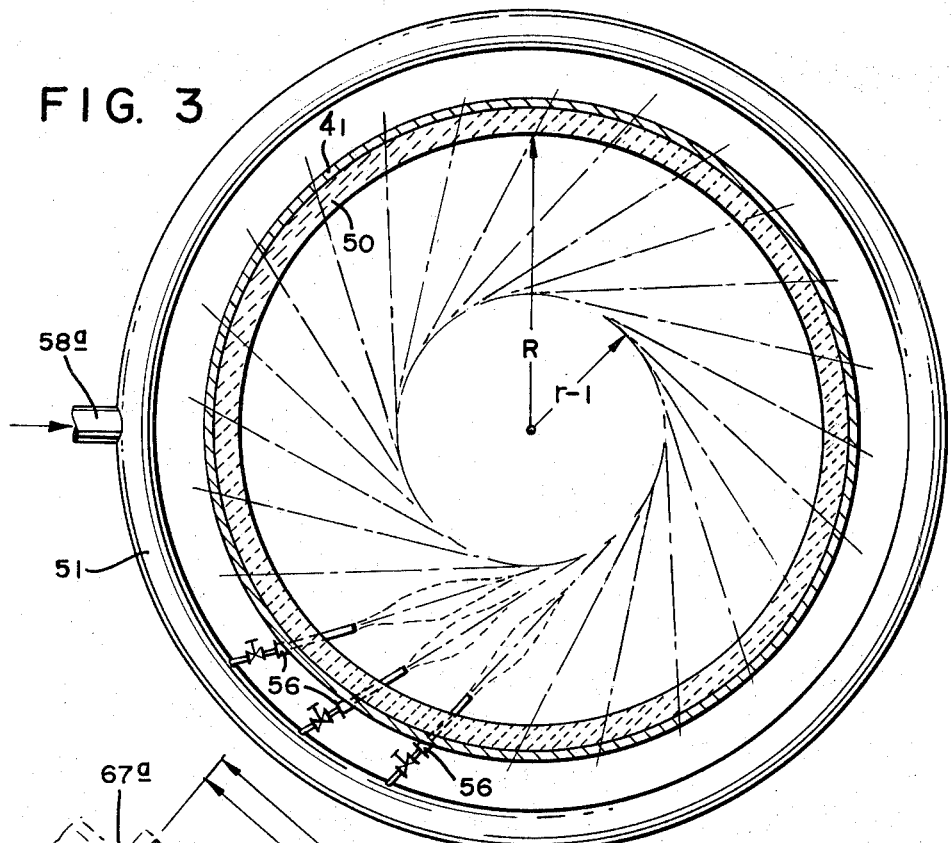
FIG. 3
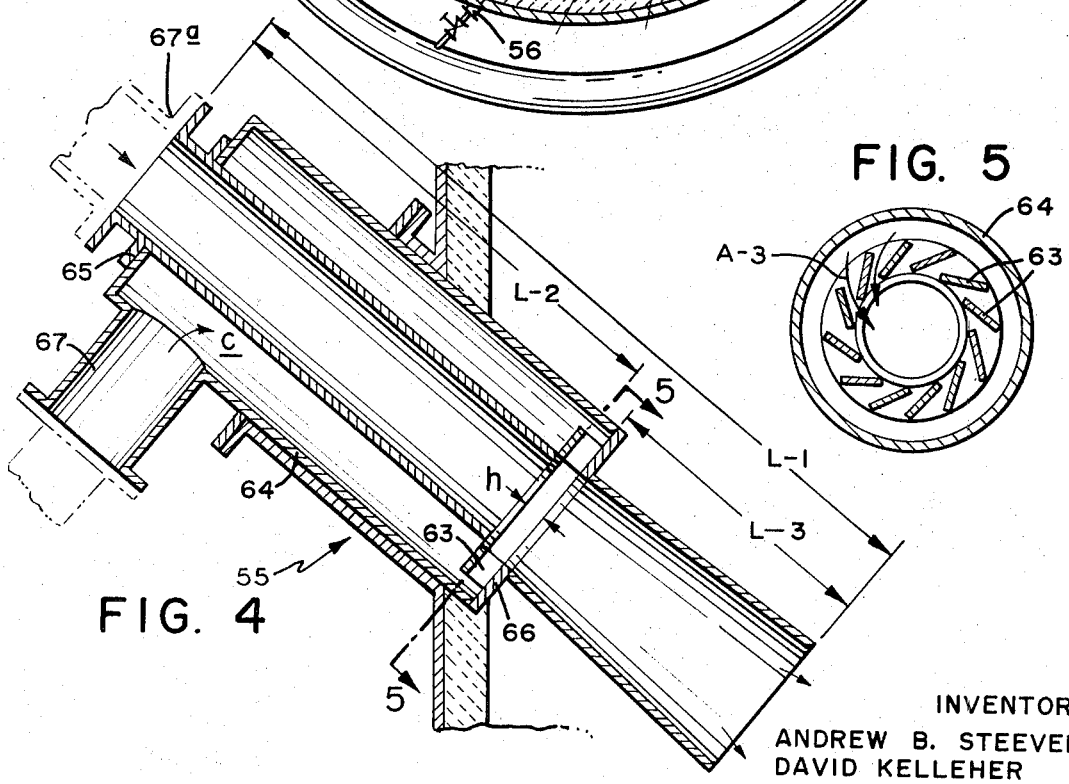
FIG. 4
FIG. 5
INVENTORS.
ANDREW B. STEEVER
DAVID KELLEHER
BY: Theodore M. Jablon
ATTORNEY.

PATENTED FEB 4 1975

INVENTORS.
ANDREW B. STEEVER
DAVID KELLEHER
BY: *Theodore M. Jablon*

ATTORNEY.

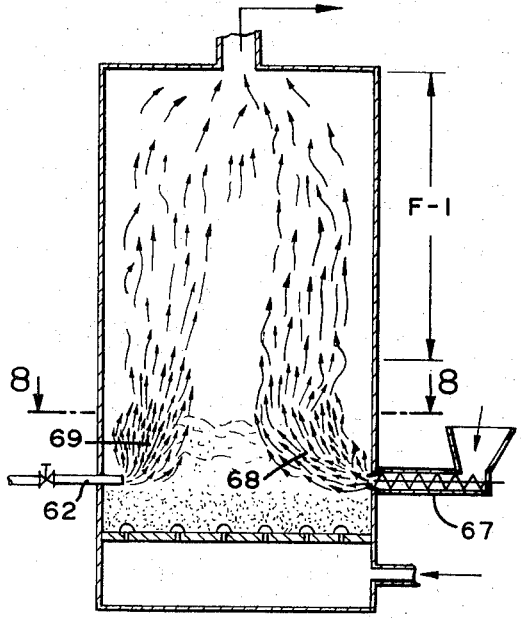
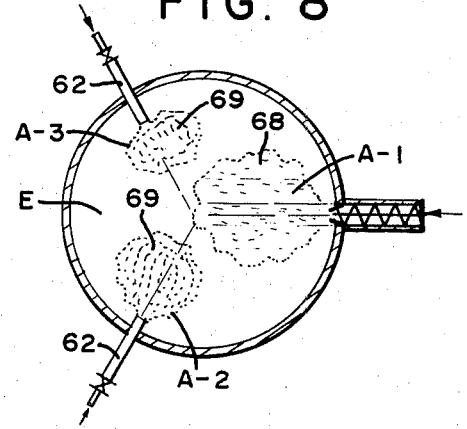
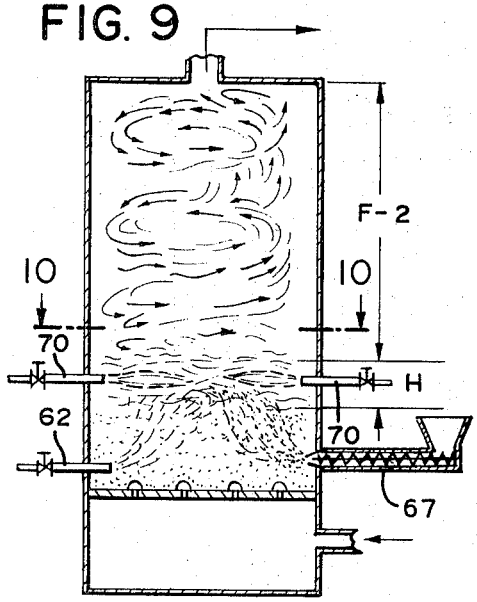
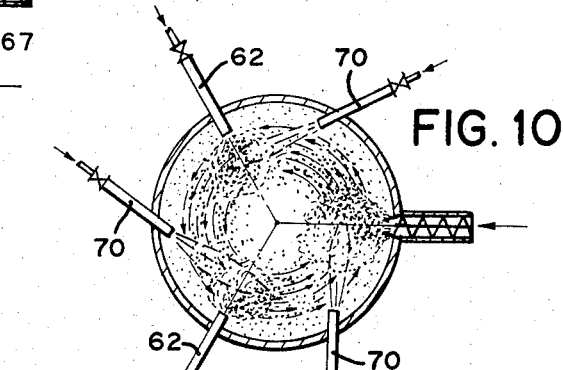
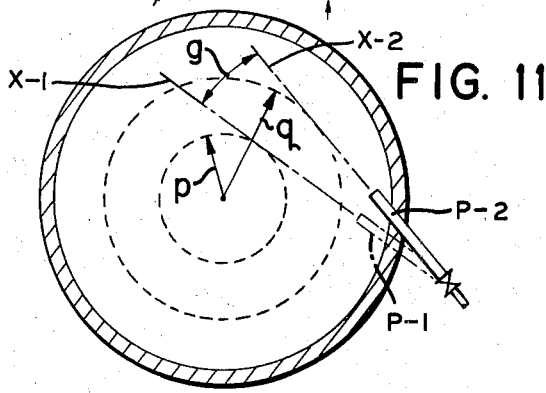

FLUIDIZED BED REACTOR

This invention relates to improvements in carrying out the combustion of waste material in a fluidized bed reactor. Combustion in such a reactor is effected by feeding the waste material to a bed of inert grannular heat storing material or sand maintained in a state of fluidization by means of upflowing combustion air forced from the wind box of the reactor up through the constriction plate that supports the bed of sand.

Examples of the combustion of organic waste material in or above a bed of fluidized sand are known for instance from the U.S. patents to Albertson No. 3,351,030, Albertson No. 3,366,080, and Logan & Albertson No. 3,580,193.

It is a general object of this invention to prevent "after-burning" in the freeboard above the bed. To minimize "after-burning" in the sense of this invention means to conduct the combustion process in such a manner that complete combustion is obtained in a compact zone directly above and merging with the top strata of the fluidized bed.

For example, when feeding a material such as dewatered sewage sludge or other solid or liquid waste fuel directly into the lower portion of the fluidized bed, "after-burning" may occur well above the fluidized bed. That condition is caused by some unburned material reaching the top strata of the bed due to inadequate dispersion and distribution in the bed, and also due to the fact that the combustion gases tend to follow a straight upward path to the stack, with after burning in the upper part of the freeboard space. While increasing the depth of the bed might reduce after-burning, the power cost of fluidizing a deep bed may become excessive.

In view of the above mentioned problem of after-burning, this invention according to one embodiment, is herein illustrated as being applied to the combustion of the organic constituents derived by a process of separation from domestic or municipal garbage, that is by separation from the noncombustible junk and trash. The U.S. Patent to Baxter No. 3,549,010 for instance discloses a process wherein these organic constituents are obtained by way of a combination of hydraulic and mechanical separation, the separated organic material then to be dewatered, and the dewatered material to be subjected to combustion.

With an organic high-moisture waste material derived in this manner, the problem is how to attain and to maintain complete combustion efficiently and economically in a fluidized bed reactor. The difficulty is due to low bulk weight and the fluffy or spongy character of this material which results from the aforementioned garbage separating treatment with a solids content typically of 40 to 45 percent. This water content must be evaporated and superheated to combustion temperature.

More in particular, the problem here is due to the fact that such loose and fluffy material even though high in moisture, would not lend itself to being introduced mechanically directly into the fluidized bed itself. This is due to the difficulty of distribution to a plurality of feed points by means of screw feeders spaced around the bed. Mechanical distribution of this material to multiple feed points would be uneconomical and mechanically complicated.

On the other hand, when introducing a material of this kind into the freeboard space, directed downwardly towards the bed, the problem is due to the difficulty or inability of attaining efficient combustion in a zone close to the surface of the fluidized bed. Hence, the combustion would occur at best in a high zone of after-burning, with the ensuing undesirable conditions and results, such as excess temperatures in the waste gas ducts and, as the case may be, in the preheater for the combustion air. Furthermore to maintain complete combustion under these conditions is economically untenable because of the large amount of extra fuel that would have to be injected into the bed in order to maintain the necessary bed temperature. Moreover, the operation would be technically impractical due to the resulting large volume of high temperature stack gases thus being produced.

Therefore, it is another object of this invention to provide a fluidized bed reactor capable of handling the combustion of waste material in such a manner that after-burning is minimized when the material is introduced into the freeboard space above the bed.

Still another and more specific object is to provide a fluidized bed reactor particularly adapted for the combustion of the aforementioned loose and fluffy organic fraction derived from municipal or industrial garbage by separation from the non-combustible matter and trash.

The foregoing objects are attainable by the provision of air injection means or high velocity air jet devices mounted in the reactor wall, and constructed and arranged in a horizontal plane, so as to establish and maintain a combustion zone of high turbulence directly adjacent to, and merging with the top strata of the fluidized bed. The jets placed at a suitable angle relative to the associated radius of the reactor, will maintain such turbulence in such a zone in a horizontal swirl.

In this relatively confined or compact combustion zone of high turbulence, the waste material is subjected to combustion in the presence of oxygen supplied by the air jets and by the fluidizing air. Furthermore, sand particles being constantly thrown up from the bed into this combustion zone are heated continually by convection in this combustion zone, then falling back to remingle with the body portion of the bed.

This heat transfer by convection together with heat radiating from the combustion zone down into the bed, tends to maintain a suitably high bed temperature.

Combustion efficiency in a fluid bed reactor can be judged by observing the temperature difference between the fluid bed and the exhaust gases at the reactor outlet. For example, a low bed-to-freeboard temperature differential means that heat is being efficiently transferred to the bed. On the other hand, a high temperature differential indicates that the combustion zone extends to the uppermost parts of the freeboard space, and that heat is lost in the stack instead of being transferred to the bed.

However, by establishing the combustion zone at the bed level in accordance with this invention, after-burning and stack gas temperatures are minimized, and the combustion can be carried out efficiently and economically either by autogenous combustion of high moisture waste, or else with only a minimum addition of supplemental fuel in the fluidized bed when fuel value is somewhat low and/or the feed moisture content is somewhat high.

According to said one embodiment, the loose and fluffy yet high moisture organic garbage material is blown through the freeboard space towards a target area of the aforementioned combustion zone. For that purpose the invention may advantageously employ a feed nozzle to which air pressure is applied in such a manneer, as to cause the waste material to be emitted from the nozzle in a conically widening spiral motion, and at a speed high enough to reach the target area of the combustion zone, against the relatively slow upward velocity of the less dense hot combustion gases. As the material reaches said combustion zone, the horizontally directed air jets and the turbulence in this zone cause the simultaneous dispersion and combustion of the material horizontally over the area of the bed.

Specific features are found in the construction of the feed nozzle producing the spirally widening downwardly directed motion of the material.

In another embodiment of the invention herein illustrated, the waste material, for instance dewatered sewage sludge or other waste fuels, are introduced directly into the fluidized bed. Incomplete combustion and after-burning occurs due to the material or liquid or gaseous fuel channelling upwardly through the bed.

With the present invention, unburned material reaching the top strata of the bed, or combustible vapors or gases developing from the material, are subjected to the action of the air jets imparting to the material a high horizontally directed velocity component, and thus to horizontal dispersion and combustion in a zone close to the fluidized bed.

It is a feature of this embodiment that the depth of the bed to be fluidized can be reduced to the extend compatible with the requirement of heat storage in the bed, yet with after-burning being minimized.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

FIG. 1 shows a garbage separating flow sheet illustrating one embodiment of the invention, with a feed nozzle emitting the waste material into the free board space, and cooperating with auxiliary air jet devices creating a combustion zone close to the bed.

FIG. $1^a$ is a vertical section taken on line $1^a-1^a$ through an apparatus unit contained in the flow sheet of FIG. 1.

FIG. $1^b$ is a plan view of the apparatus unit of FIG. $1^a$.

FIG. $1^c$ is a vertical section taken on line $1^c-1^c$ through another apparatus unit contained in the flow sheet of FIG. 1.

FIG. 2 is an enlarged semi-diagrammatic vertical sectional view of the fluidized bed reactor from FIG. 1, including air jet devices effective in an over bed combustion zone, and an air pressure operated feed nozzle for the waste material, directed downwardly towards the combustion zone.

FIG. $2^a$ is an enlarged fragmentary detail view of the constriction plate taken from FIG. 2.

FIG. 3 is a cross-sectional view taken on line 3—3 of FIG. 2, showing arrangement of the air jet devices.

FIG. 4 is a greatly enlarged detail sectional view of the feed nozzle for the waste material, featuring an internal fixed air spinning turbine blade arrangement.

FIG. 5 is a cross-section through the turbine blade arrangement, taken on line 5—5 in FIG. 4.

Figure 6:
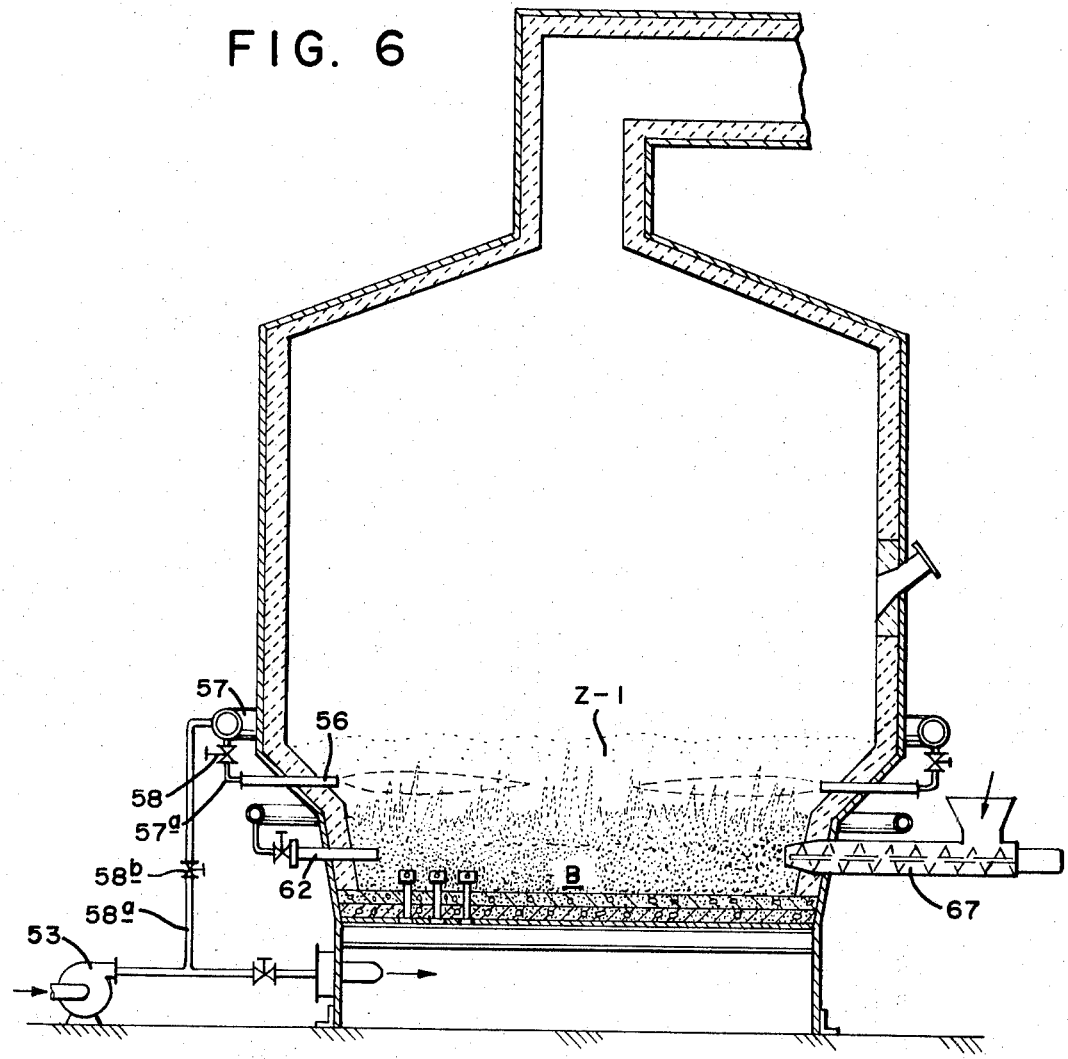
FIG. 6 is a vertical sectional view of the reactor similar to FIG. 2, but illustrating another embodiment of the invention.
Figure 6A:
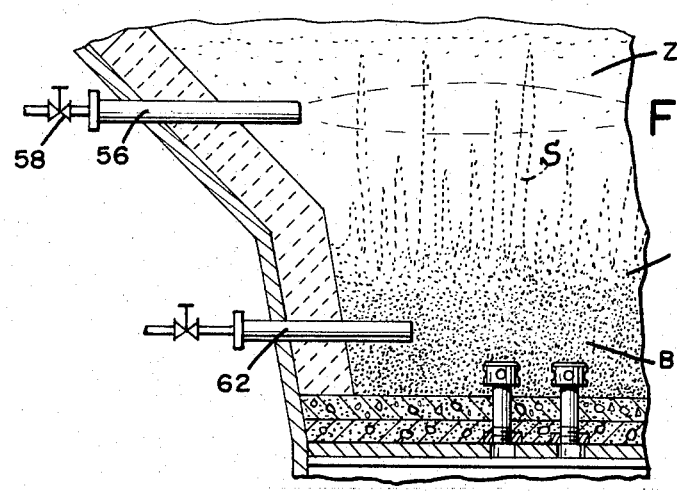

FIG. $6^a$ is enlarged fragmentary detail view of the fluidized bed illustrating heat exchange between the bed and the combustion zone above.

FIG. 7 is a schematic elevational view of the reactor, which illustrates the operation lacking the provision of the air jet devices of this invention.

FIG. 8 is a cross-section taken on line 8—8 in FIG. 7.

FIG. 9 is a schematic elevational view similar to FIG. 7, illustrating how after-burning is avoided by this invention.

FIG. 10 is a cross-section taken on line 10—10 in FIG. 9.

FIG. 11 is a schematic cross-section of the reactor taken in the plane of the air jet nozzle, illustrating their potential angular positions.

The fluidized bed reactor or waste combustion unit 10 of this invention, as seen in the flow sheet of FIG. 1, receives an organic waste material in the form of a loose and spongy or fluffy, yet high moisture aggregate.

In this example of the invention, an organic waste material of this nature is derived from municipal garbage containing the organic waste constituents mixed with the familiar non-combustible junk and trash, as well as with stones, gravel, grit and sand.

According to FIG. 1, the separation of the combustible material from the garbage is achieved in a separating treatment plant which receives the garbage collected by a garbage truck 11 delivering onto a conveyer 12 operating in garbage pit or vessel 13.

This conveyer elevates the garbage from the pit for delivery to a first or coarse separating unit 14 which eliminates the non-combustible junk and trash from that fraction which contains the organic matter still mixed with grit and sand and miscellaneous other non-combustible particles.

This garbage separating unit is of the type shown in the Black & Clawson Co.'s Research Center Technical Report, Shartle Pandia Division, Middletown, Ohio.

Briefly, in this machine the desired separation is effected hydro-mechanically, that is in a tank 15 containing a body of water, at the bottom of which rotates a cutting beater 16 driven by a motor drive unit 17 located underneath the tank. This tank, while receiving the garbage from conveyer 12 as indicated by arrow A-1, has operating water supplied thereto as indicated by arrow A-2. The beater cutting up the garbage, throws the junk-bearing material to an outer inverted conical portion of the tank bottom, provided with a junk delivery opening 18. Through this opening the junk reaches a bucket elevator 19 delivering it to a vehicle 20 for disposal.

The combustible organic fraction along with the grit passes through a perforated false bottom portion 21 directly underneath the beater into an annular receiving box 22 from which a pump 23 draws this material for delivery under a suitable operating pressure to a cyclone separator 24. The cyclone separates the gritty matter in the underflow, while delivering the mixture of the water and organic waste to a storage tank 25. The underflow material is discharged into the atmosphere periodically through a receiver chamber R by inlet valve V-1 and outlet valve V-2.

A pump 26 delivers the suspension of the now degritted organic material to an inclined dewatering screw 27 discharging the separated water at 28. The dewatered material, through a horizontal screw feeder 29 is passed on to a dewatering press also shown in the aforementioned Technical Report, and known as the Rietz V-Press.

The waste material thus reduced to a solids concentration of between 40 and 50 percent is ready to be fed into the free board space of the fluidized bed reactor 10, by way of a duct 30 leading to a cellular wheel 31 which meters the material into an air pressure duct 32 leading from a metering type air blower 33 to a pneumatically operated feed injection nozzle 34 further to be described below (see detail FIGS. 4 and 5). Thus, the material is blown into and through the free board space of the reactor and onto a target area of the fluidized bed, roughly indicated at 35.

The combustion gases pass through stack or waste gas duct 36 and through a venturi type scrubber 37, and finally through a cooling chamber 38 into the atmosphere. Spent scrubber water is recirculated by a pump 39, while a pump 40 draws the excess from the system.

Referring now more particularly to FIG. 2, the construction and operation of the reactor of this embodiment, are described as follows:

The steel shell or housing 41 of the reactor, is divided by a constriction plate 42 into a wind box chamber 43 underneath and a combustion chamber 44 above the plate. The wind box is of straight cylindrical shape, while the combustion chamber comprises a lower section 45 of inverted steeply conical shape, containing a bed 46 of fluidized sand, an intermediate section 47 of a more obtuse conical shape, and a cylindrical body portion 48 closed by a conical top portion 49 connected to the stack or waste gas duct 36. A layer of refractory material 50 provides the lining for the combustion chamber.

The constriction plate as herein shown comprises a steel plate 51 supported by I-beams 52, and formed with holes having thread connections with well known nozzles, so called tuyeres 52$^a$. A blower 53 connected to the wind box chamber 43 forces combustion air through the tuyeres, maintaining the bed in a fluidized state. But upon shutdown of the fluidizing air, these tuyeres will prevent back sifting of the sand into the wind box chamber.

The tuyeres extend from the plate upwardly through a bottom layer 53$^a$ of insulating material having high insulating quality, but low resistance to abrasion, and a top layer 53$^b$ of low insulating quality, but of high resistance to abrasion.

Still referring to FIGS. 1 to 3, the organic waste material derived from the above described garbage separating operation, is pneumatically projected into the freeboard space above the bed by means of a downwardly slanted feed injection nozzle 55 mounted in the reactor shell and aimed at the surface of the fluidized bed. This feed nozzle is designed for projecting the waste material into the free board space, in a spirally widening downward motion, roughly defining a target or impact area "A" on the fluidized bed.

In accordance with the invention, the feed material is emitted from the nozzle at high speed such that, while penetrating the rising combustion gases, it will be projected into a zone of a depth roughly indicated as Z-1. This is a zone of high turbulence created by the provision of a set of auxiliary air jet devices 56 mounted in the intermediate conical section 47 of the shell.

These air jet devices are located in a horizontal plane adjacent to the "live" or "boiling" surface strata of the fluidized bed, as indicated by the distance "$d$" which may be in the order of 12 inches under practical conditions. As exemplified in FIG. 3, for a bed about 20 ft. in diameter at the top, there are provided 24 such air jet devices angularly arranged so that the axes of the jets constitute tangents of a circle of radius r-1 (see FIG. 3) here shown to be about one half of the radius R of the bed.

FIG. 11 diagrammatically indicates practical limits for the angular positioning of the air jet devices, namely with a jet axis X-1 being tangent to a smaller circle of the radius "P" and a jet axis x-2 being tangent to a larger circle of the radius "$q$".

An annular air pressure supply header or bustle pipe 57 surrounding the reactor, has individual branch pipe connections 57$^a$ with the respective air jet devices, each such connection in turn being provided with a control valve 58. Air pressure supply for the bustle pipe may be obtained through branch pipe 58$^a$ and control valve 58$^b$ from blower 53, which blower also provides the fluidizing combustion air for the wind box chamber through a control valve 59, as well as operating air for the feed nozzle 55, this through a branch pipe 60 provided with control valve 61. However, it should be understood that individually controllable sources of pressure air supply may be provided, such as individual blowers connected to the wind box 43, the air jet devices 56, and the feed injection nozzle 55 respectively.

An auxiliary fuel supply system 62 is indicated for injecting fuel directly into the fluidized bed whenever necessary to raise the bed temperature sufficiently so as to sustain the combustion process, for instance in case of undue increase in moisture content of the feed material.

An alternate location of the feed nozzle in the roof of the reactor is indicated in dot-and-dash, and designated as F-1.

Referring to the detail FIGS. 4 and 5, the feed nozzle 55 is constructed for pneumatically injecting and dispersing the waste material, comprising a composite linear feed conduit of the length L-1, consisting of a tubular feed inlet section of the length L-2, and a tubular feed emitting section of the length L-3 coaxial with the inlet section.

A set of fixed turbine blades 63 separates as well as rigidly interconnects the inner mutually adjacent ends of the sections L-2 and L-3, the axial spacing being defined by the height "$h$" of the turbine blades.

A tubular jacket 64 surrounds not only the feed inlet section L-2, but also the set of turbine blades, and together with annular end plates 65 and 66 defines an annular air pressure chamber C. A lateral flanged neck 67 of the jacket connects with air pressure supply branch pipe 60, while the nozzle inlet section L-2 has a flanged connection 67$^a$ with the feed supply duct 32.

Primary air pressure from metering blower 33 continually projects the feed or waste material through the feed nozzle into the free board space of the reactor, while extra air pressure maintained in the jacket chamber C will through the turbine blades impart a spinning motion to the waste material being delivered by the slightly flared or slender conical shape of the emitting section L-3 of the feed injection nozzle.

The air pressure supplied to the jacket chamber C of the feed nozzle is high enough to establish an inward air flow velocity past the turbine blades, as indicated by arrows A-3 (see FIG. 5). For the example herein illustrated in a connection with a reactor having a 20 ft. diameter bed, this flow velocity is in the order of 30,000 feet per minute. The resulting exit velocity of the material from the nozzle is in the order of 6,000 ft/min.

As a result, the momentum of the waste material is such as to traverse the free board space of the combustion chamber, dispersed by the spinning motion in a spirally widening path to the bed. Upon reaching the combustion zone Z-1 the material is further dispersed horizontally by the air jets 56, and thoroughly mixed with the sum total of combustion air comprising the fluidizing air, the air from the air jet devices or over bed air nozzles 56, and the air that goes into operating the feed injection nozzle 55.

The waste material thus introduced will permeate the zone Z-1 of the turbulence and horizontal mixing, and thus be subjected to combustion within that zone substantially.

According to the embodiment in FIG. 2 the operation of the reactor is as follows:

To bring the reactor from ambient temperature to combustion temperatures, a preheat burner 68 is operated until the reactor and the bed will have reached normal operating temperature, after which the preheat burner is shut off.

With the reactor at normal operating temperature, the incineration process is started in the following manner:

First, fluidizing air is admitted to the wind box 43 while another portion of the combustion air is supplied to each of th overbed air nozzles 56. As soon as the bed is fluidized, auxiliary fuel from the supply system 62 is injected into the bed, at a ratio sufficient to maintain the operating temperature until the feed supply through feed nozzle 55 will have reached the bed. Thereupon, the supply of fuel oil into the bed may be discontinued if the feed material has sufficient fuel value for autogenous combustion.

Otherwise, a small amount of fuel oil can be used if the combustion is not autogenous because of high moisture content and/or low fuel valve.

The feed material projected by the feed nozzle 55 towards the combustion zone, contains heavier particles penetrating into the bed, particles of intermediate weight burning near or at the bed surface, as well as particles of the lightest fraction burning a corresponding distance from the bed.

With combustion performing in this manner, the air jets assume the appearance of flames indicating instantaneous combustion of the waste material close to the bed. Moreover, rapid heat transfer is achieved from the said combustion zone to the bed, such being due in part to heat radiation from that zone and from the flames, and in part due to heat transfer by convection to sand particles continually being projected from the bed upwardly into the combustion zone, and falling back into the fluidized bed (see FIG. 6$^a$).

In this way there is maintainable a minimum differential of temperature between the bed and the adjacent combustion zone Z-1, this differential being a criterion of the efficiency of a combustion process whereby after burning is avoided.

Thus it will be understood that the efficient and economical combustion of the waste material is achieved without after burning by the conjoint effect of the operation of the air jet devices 56, the feed injection nozzle 55, and the fluidized bed.

In another embodiment illustrated in FIGS. 6 to 10, the invention while featuring the above described air jets for maintaining the combustion zone of turbulence and horizontal mixing, differs from the operation of the reactor of FIG. 1, in that it involves the introduction of the waste material directly into the fluidized bed, that is at a level a substantial distance below said combustion zone. An example of this mode of operation is the disposal by combustion of dewatered sewage sludge such as obtainable for instance in a sewage treatment plant described in the U.S. Patent to Albertson No. 3,351,030.

Accordingly, In FIG. 6 the reactor is similar to the one of FIG. 1, with respect to the arrangement and mode of operation of the air jet nozzles 56 and its supply connections 57$^a$, 57, 58, 58$^a$ and 58$^b$, with the blower 53. In this example, sewage sludge supplied with a water content of about 65 to 80 percent, is delivered to a suitable feeding device, such as screw feeder 67 designed to introduce the sludge into the bed against the pressure prevailing inside the reactor. A plurality of feed introduction points may be provided evenly spaced about the bed, for instance in the manner shown in U.S. Patent to Hirschfield No. 3,399,637.

Also provided are the previously described supply means 62 for the injection of supplemental fuel into the fluidized bed.

Normally, when burning such sewage sludge in a fluidized bed reactor, after-burning occurs when unburned sludge material or unburned gases developing therefrom, rise from the top strata of the bed.

These sludges furthermore require the continuous injection of supplemental fuel into the bed, in order to maintain the combustion. Increasing the depth of the bed might reduce after burning although at higher power cost for fluidizing air pressure. But in the practice of this invention, such increase in bed depth is avoided. Moreover, the amount of supplemental fuel is reduced due to the high combustion efficiency attainable by this invention.

The operation to avoid after-burning in this embodiment is illustrated by way of contrast in the schematic FIGS. 7 to 10.

Thus, in conventional operation (see FIGS. 7 and 8), that is to say without the benefit of the auxiliary air jet devices, the combustion gases follow a vertical upward path to the stack. Hence, after-burning occurs in the high zone "F-1" of the free board space above the bed, with areas "E" (see FIG. 8) of excess or unmixed air surrounding the relatively isolated areas A-1, A-2 and A-3 of the waste material and of the supplemental fuel respectively at the bed level.

By contrast, FIGS. 9 and 10 employing the jet devices 70 show how horizontal mixing and rotational turbulence are induced in a low zone "H" which then becomes the main combustion zone adjacent to the top strata or top level of the fluidized bed. The upper free board zone "F-2" contains the after-swirl of the combustion gases, whereby any residual combustion is completed well before the combustion gases reach the stack.

With this mode of operation, the depth of the fluidized bed, and hence the cost of maintaining the state of fluidization, is kept at a minimum compatible with the heat storage requirement of the operation, that is the heat storage capacity of the bed sufficient to allow for a quick re-starting after periods of shutdown of the reactor. At the same time the required amount of supplemental fuel is minimized.

The angular position of the horizontal air jet devices relative to the associated radii of the bed, may be determined depending upon the diameter of the bed. While FIG. 3 shows these air nozzles arranged so as to impart a circular horizontal swirl to the upflowing combustible mixture, the angle "g" in FIG. 11 indicates that there is a range of angular nozzle positions wherein the maximum benefits of over bed air combustion are obtainable.

The angle "g" is herein defined tentatively by a position P-1 of the jet nozzle with the jet axis tangent to a smaller circle of radius "p," and by a position P-2 of the jet axis tangent to a larger circle of radius "q."

FIG. 6ª illustrates the manner in which heat exchange is effective between the combustion zone Z-1 and the fluidized bed B, due to sand particles S being thrown into the combustion zone or flames, which particles having thus been heated fall back into the fluidized bed. This heat exchange by convection together with the heat radiating from the combustion zone Z-1 and from the flames down into the bed, establish the condition for optimum combustion.

SUMMARY

This invention greatly improves the efficiency and economy of the combustion process in a fluidized bed, by the provision of the air jet devices disposed in a horizontal plane a short distance above the top strata of the fluidized bed. The arrangement and operation of these jets is such as to impart to the upflowing gases a circular swirl in a horizontally extending combustion zone close to the bed. With a high enough jet velocity, a horizontally directed high velocity component is thus imparted to the combustible mixture, instead of allowing the gases to follow a vertical upward path from the bed with the resultant undesirable after-burning in the upper zone of the freeboard space.

Depending upon the purpose and conditions, as well as upon the kind of feed material to be burned in the reactor, the material may be introduced either into the freeboard space above the bed, or else directly into the lower portion of the bed, with the air jets of this invention providing the over bed combustion zone and the horizontal swirl.

Introduction into the freeboard space may be effected in several ways, such as by non-mechanical dispersion with free fall by gravity, or by pneumatical dispersion over the bed surface (as herein illustrated) or by mechanical dispersion over the bed surface. In the instance of combustion of sewage sludge, it may be preferable to have the feed material introduced a substantial distance below the top strata of the bed, at one or more points of feed supply.

Without the provision of these air jets, and the over bed combustion zone and swirl, the combustion proceeds unevenly across the area of the bed, namely in portions that are deficient in available combustion air, while other portions of the area have excess air not in proximity with the fuel or combustible matter. The resultant poor combustion efficiency is due to the fact that a. air and combustion gases tend to follow a vertical upward path with minimal laterally directed motion; that b. partly burned fuel vapors must complete their combustion by reacting with excess air in the upper zones of the free board space of the reactor, and that c. in the case of sludge feed directly into the bed itself, the area near the sludge feed point contains large amounts of water vapor which inhibits the oxygen in the air from reacting with the volatilized sludge fuel vapors, which also contribute to after burning.

But with the provision of the air jets located at a distance of about one foot above the bed, the jets cause intense mixing with one another of air, combustion gases, and combustible substances and vapors, including those from any auxiliary fuel that may be injected into the bed, all in a turbulent combustion zone close to the bed.

In the over bed zone of supplemental jet air supply, the vertical direction of flow of the combustion gases and unburned vapors is given a predominating horizontal component by the high velocity of the jets. The swirling motion thus imparted to the gases by the jets causes intense mixing of the partially burned fuel or sludge vapors with air richer in oxygen. Combustion thus is nearly completed just above and close to the top strata of the bed, while residual combustion is completed in a zone of continued swirling to a distance a few feet above the bed. Water vapor from the material is dispersed in the swirl, thus allowing combustion to proceed uninhibited.

At the same time, heat transfer from this combustion zone back to the bed is greatly improved, which is equvalent to saying that the bed-to-free board temperature differential is minimized. Thus, heat by convection is transferred due to sand splashing up from the surface of the fluidized bed and entering the swirl of the turbulent over bed combustion zone. Thus the particles are heated by direct contact with the combustion products, and when these particles fall back to the bed, they in turn transfer the heat back to the bed.

In addition, heat is transferred by radiation from the combustion zone down to the bed surface much more efficiently than in conventional combustion, since waste material or sludge is burned close to the bed surface, with heat transfer by radiation being inversely proportional to the square of the distance.

For maintaining an effective horizontal swirl in the over bed combustion zone, the velocity of the air jet at the tip of the air nozzle should be high enough to penetrate into the aforementioned combustion zone. For large diameter beds, in order to secure adequate penetration horizontally, this jet air velocity must be very high relaltive to the net, upward flow or so called space rate of the combustion gases, and may be correspondingly lower for the smaller beds.

As an example, for a 20 foot bed diameter in a reactor according to FIGS. 1 and 2, with 24 air jet devices provided in the over bed air jet devices provided in the combustion zone, the air jet velocity is in the order of 30,000 feet per minute, with an upward flow rate (space rate) of the combustion gases in the order of only 120 to 240 feet per minute.

The provision of the over bed air jets makes possible a reduction of the bed depth often required to be 5 feet or even more, in order that after-burning might be discouraged, and the free board temperatures reduced. A reduction of one foot or more in fluidized bed depth however is thus made possible, yet without after-burning, and with a corresponding saving in power consumption of the fluidizing blower.

With the provision of the air jets in the manner of this invention, savings are attainable furthermore in the amount of auxiliary fuel needed for the combustion of high moisture waste.

Although illustrated in connection with the combustion of garbage and of sewage sludge respectively, the invention involving the provision of the over bed auxiliary air supply, also lends itself advantageously for the disposal by combustion of other wastes solid, liquid, or gaseous. For example, such wastes may comprise waste oil sludges or emulsions from machine shops and oil refineries, and off gases from chemical plants and refineries.

Auxiliary fuel if needed in the combustion of high moisture waste, may be any fuel oil up to and including "Bunker C" oil, as well as gaseous fuels such as natural gas, propane, coke oven gas, or sour refinery off gases.

Refinery sludges may be those containing sodium sulphate, spent catalyst and hydrocarbon solids, as well as sodium and chlorine compounds.

The auxiliary air jet devices while improving the combustion process in the manner above set forth, also provides a high degree of operational flexibility in the sense that the amount of supplemental combustion air from the jets is controllable relative to the amounts of combustion air required to meet the fluidization requirement.

The amount of fluidizing air however depends upon the design dimension such as depth and diameter of the bed, which in turn is coordinated to the design of the constriction plate with respect to the upflow passage area therein.

For example, where the requirement is for a bed substantially smaller than the diameter of the free board space of the reactor, the amount of fluidization air needed may be less than what is stoichiometrically required for combustion of waste material fed into the bed. While at best only incomplete combustion is thus attainable in the bed itself, the deficiency is made up by adjusting the air supply from the jet nozzles. Thus, the bed need not be over dimensioned. Also, cooling of the bed by the fluidizing combustion air is thus minimized.

Otherwise expressed, with the over bed air jet nozzles available for control purposes less air flow will have to pass through the constriction plate, making smaller diameters possible for the constriction plate. Thus, the reactor can be designed with a constriction plate substantially smaller than the diameter of the free-board space, and with the bed widening upwardly to the diameter of the free board space. Less fluidizing air is then needed and less fluidizing power from the air blower, while any deficiency in combustion air is compensated for by a corresponding increase in the supply from the jet nozzles. Yet, the overall combustion efficiency remains swirling and mixing action of the jets.

Referring to the illustrations in FIGS. 3 and 7 to 10, the arrangement and operation of the air jets nozzles depends upon such factors as a. diameter and depth of the bed,
b. the number of over bed air jetz nozzles involved,
c. the number of sludge feed connections leading into the bed,
d. the number of connections for adding supplemental fuel into the bed.

The over bed jet air may be either of ambient temperature or heated by means of auxiliary preheating equipment utilizing the heat of the stack gases from the reactor. The choice of either one of these alternatives depends upon the caloric value and the moisture content of the fuel or waste material being subjected to combustion. An overall heat balance of the operation of the fluidized bed reactor will indicate the over bed air temperature required.

It is noteworthy however that the use of the air jets in accordance with the invention, protects the air preheater against increasingly high stack gas temperature.

In summary, the effects attainable due to the provision and operation of the auxiliary air jet devices according to the invention are as follows:

1. Intense agitation and horizontal mixing in a combustion zone just above the fluidized bed.
2. With over bed feeding of the waste material combustion air is supplied by the air jets and by the fluidizing air to particles in the feed impact area, where the combustion comprises that of discrete particles of feed material, as well as gas phase formed from volatilized fuel burning in or near the bed.
3. Even distribution of heat from the feed impact zone across the surface of the bed.
4. Combustion is largely confined to a low zone at the bed surface, instead of higher up in the free board zone and exhaust duct.
5. Heat transfer from the combustion zone to the bed is greatly intensified by convention (splashing sand) and by radiation.
6. Cooling of the bed by the fluidizing combustion air is minimized, since less air passes through the bed, with the balance or excess air provided by the jets.
7. The need for providing multiple feed points is avoided by pneumatic feeding through the feedboard space, while achieving even feed distribution and combustion across the bed.
8. Materials of low bulk-density fed from above can be burned effectively close to the bed surface.
9. Savings are attainable in air blower power requirements, due to possible reduction in required depth of the fluidized bed.
10. Savings are attainable in auxiliary fueld requirements, due to the high combustion efficiency in the reactor, incident to the elimination of after-burning.
11. Excess air requirements are minimized, contributing to high combustion efficiency especially in the combustion of high moisture waste material, incident to the elimination of after-burning.

The invention is more specifically substantiated by way of an example of the following successful operating results of one tested reactor unit of the type illustrated in the drawings. The tested reactor unit was provided with a bed measuring 20 feet in diameter, a fluidized bed depth of about 5 feet, and 24 air jet nozzles above the periphery thereof.

Solid waste material having a moisture content of 55 to 60 percent water was fed to the reactor at a rate of 85 to 90 lbs. per minute. The material was successfully burned under autogenous conditions in accordance with the hereinbefore described invention under the following operating parameters over an average eight hour day operation.

Temperatures
Ambient Air: 75°F
Air Entering Reactor (includes heat of compression) = 140°F
Fluid Bed Temperature = 1450°F
Reactor Exhaust Temp. = 1640°F
Pressures
Windbox Pressure = 2.7 psi
Overbed Air Manifold = 4.3 psi
Bed Depth = Approx. 55. inch
Freeboard Pressure = 14" of Water = .5 psi
Pneumatic Conveyer = 2.5 psi
Air Rates & Overbed Air Velocity
Total Air Flow = 13,900 SCFM
Overbed Air = 2,100 SCFM
Feed Nozzle Air = 500 SCFM
Fluidizing Air = 11,300 SCFM
Air & Gas Velocities
Freeboard Gas
Superficial Space  = 2.2 ft/sec
Velocity Average Velocity
Total                       = 17,000 ft./min
Overbed Air Nozzle
Fuel Rates
Auxiliary Fuel Rate = Zero
(No. 2 Oil)

Although one embodiment and operating example of the present invention has been illustrated and described in detail, it is to be expressly understood that the invention is not limited thereto. Various changes can be made in the design and arrangement of parts without departing from the spirit and scope of the invention as the same will now be understood by those skilled in the art.

We claim:

1. A fluidized bed reactor for the combustion of waste, which comprises an upright housing, a horizontal construction plate dividing the housing into a wind box chamber below, and a combustion chamber above said constriction plate, said constriction plate being adapted to support a bed of sand, a stack gas connection for the reactor housing, discharging the combustion gases, controllable means for supplying combustion air under pressure to said wind box chamber, effective to maintain said bed of sand in a state of fluidization, a plurality of air jet devices mounted in the reactor wall, and provided with a controllable air pressure supply, said air jet devices being arranged so as to establish rotational turbulence in a zone of combustion adjacent to, and merging with, the top strata of the fluidized bed, and feed means for supplying said waste material to said combustion zone.

2. The reactor according to claim 1, wherein the combustion chamber comprises a lower section containing said bed of fluidized sand, an intermediate outwardly widening section, and a cylindrical body portion extending upwardly from the wide end of said intermediate section, and wherein said zone of rotational turbulence is located in said intermediate section.

3. The reactor according to claim 1, wherein the longitudinal axes of said air jet devices are slanted codirectionally so that said axes become tangents of a central circular area substantially concentric with the vertical axis of the reactor.

4. The reactor according to claim 1, wherein the longitudinal axis of said air jet devices are slanted codirectionally so as to constitute with the respective associated radii of the reactor an angle of less than 60°.

5. The reactor according to claim 1, wherein the longitudinal axes of said air jet devices are slanted codirectionally so as to constitute with the respective associated radii of the reactor of an angle of about 30°.

6. The reactor according to claim 1, wherein the longitudinal axes of said air jet devices are slanted codirectionally so that said axes become tangents of a central area substantially concentric with the vertical axis of the reactor, and having a diameter of about half the inside diameter of the reactor in said plane.

7. The reactor according to claim 1, wherein said feed supply means are mounted in the reactor wall a substantial distance above the bed, and slanted downwardly with air pressure means effective to eject said waste material towards a target area of said bed.

8. The reactor according to claim 1, wherein said feed supply means are mounted in the roof of the reactor.

9. The reactor according to claim 1, wherein said feed supply means comprise a pressure-air operated feed injection nozzle mounted in the reactor housing, so as to be directed downwardly towards the bed.

10. The reactor according to claim 1, wherein said feed supply means comprise a feed injection nozzle mounted in the reactor housing, directed downwardly towards the bed, which nozzle comprises air-pressure actuated means effective to impart to the feed material a spiral twist thereby causing dispersion and spreading of the material over a target area of the bed.

11. The reactor according to claim 1, wherein said feed supply means comprise a feed injection nozzle mounted in the reactor housing so as to be directed downwardly towards the bed, said nozzle comprising a linear feed conduit for said material, having a tubular feed inlet section and a tubular feed emitting section, and a set of turbine blades rigidly interconnecting said inlet and outlet sections in axially spaced relationship with one another and coaxial therewith, a jacket structure surrounding said feed inlet section as well as said set of turbine blades, and defining an annular air pressure chamber surrounding said tubular feed inlet section as well as said set of fixed turbine blades, primary air pressure means connected to said feed inlet section of the nozzle for conveying said feed material to and through said nozzle, and secondary air pressure supply means connected to said annular air pressure chamber, and effective through said set of stationary turbine blades to impart spiral motion to the material emitted from said feed outset section.

12. The reactor according to claim 11, wherein said feed emitting section is of divergent configuration effective together with said turbine blades to impart spiral motion to produce a conical spread and dispersion of the feed material.

13. The reactor according to claim 11, wherein said feed emitting section is of divergent conical configuration and with the addition of a feed duct connected to said tubular feed inlet section of the nozzle, a metering air blower connected to said duct, to provide carrier air for feed material conveyed by said duct, and a metering device for feeding said material into said duct a a point between said blower and said feed injection nozzle, against the air pressure in said duct.

14. A fluidized bed reactor for the combustion of organic waste material, which comprises an upright housing, an horizontal constriction plate dividing the housing into a wind box chamber below, and a combustion chamber above said constriction plate, said constriction plate adapted to support a bed of sand, said combustion chamber comprising a lower portion containing said bed of fluidized sand, an intermediate outwardly widening section, and a cylindrical body portion extending upwardly from the wide end of said intermediate section, a stack gas connection for the reactor housing, discharging the combustion gases, controllable means for supplying combustion air under pressure to said wind box chamber, effective to maintain said bed of sand in a state of fluidization, a plurality of air jet devices mounted in the reactor wall, and provided with a controllable air pressure supply, said air jet devices being located substantially in an horizontal plane adjacent to the top strata of the fluidized bed, and constructed and arranged so as to maintain a combustion zone of rotational turbulence adjacent to, and merging with said top strata of the fluidized bed, said zone of rotational turbulence being located in said intermediate section.

and feed means for supplying said waste material directly into said fluidized bed a substantial distance below the top strata thereof.

15. The method of carrying out the combustion of organic waste material in a fluidized bed reactor containing a bed of inert particulate heat storing material supported upon a constriction plate, which comprises, providing a supply of combustion air underneath said constriction plate, high enough to maintain said bed in a fluidized state, supplying a plurality of air jet streams of supplementary combustion air directed in a substantially horizontal plane into a combustion zone directly adjacent to and above the top strata of the fluidized bed, said air jet streams being injected in a manner and with a jet pressure high enough to establish in said zone a state of rotational turbulence and horizontal mixing about the vertical axis of the reactor, and pneumatically injecting the waste material into said combustion zone.

* * * * *